(12) United States Patent
Dioguardi et al.

(10) Patent No.: US 7,596,250 B2
(45) Date of Patent: Sep. 29, 2009

(54) METHOD AND APPARATUS FOR ANALYZING BIOLOGICAL TISSUE SPECIMENS

(75) Inventors: Nicola Dioguardi, Rozzano (IT); Fabio Grizzi, Rozzano (IT); Carlo Russo, Rozzano (IT); Barbara Franceschini, Rozzano (IT)

(73) Assignee: Humanitas Mirasole S.P.S., Milan (IT)

( * ) Notice: Subject to any disclaimer, the term of this patent is extended or adjusted under 35 U.S.C. 154(b) by 773 days.

(21) Appl. No.: 10/504,899

(22) PCT Filed: Nov. 19, 2002

(86) PCT No.: PCT/EP02/12951

§ 371 (c)(1),
(2), (4) Date: Aug. 18, 2004

(87) PCT Pub. No.: WO03/071468

PCT Pub. Date: Aug. 28, 2003

(65) Prior Publication Data

US 2005/0254710 A1    Nov. 17, 2005

(30) Foreign Application Priority Data

Feb. 22, 2002  (WO) .................. PCT/IB02/00551

(51) Int. Cl.
*G06K 9/00*   (2006.01)
*G06K 9/46*   (2006.01)
(52) U.S. Cl. ........................... 382/128; 382/190
(58) Field of Classification Search ............ 382/128, 382/133, 249, 134, 286, 224, 190, 100, 129–132; 364/413.1; 128/634, 705, 902
See application file for complete search history.

(56) References Cited

U.S. PATENT DOCUMENTS 5,722,418 A * 3/1998 Bro ........................ 600/545
5,848,177 A   12/1998 Bauer et al. ............... 382/128
6,263,095 B1 * 7/2001 Rushbrooke et al. ........ 382/128

FOREIGN PATENT DOCUMENTS

WO    WO 97/43732    11/1997

OTHER PUBLICATIONS

Bertrand, et al: "*Basics of Video Image Analysis*", TRAC, Trends in Analytical Chemistry, vol. 10, No. 8, (Sep. 1, 1991), pp. 237-243.
Steven Prashker: "*An Improved Algorithm for Calculating the Perimeter and Area of Raster Polygons*", Proceedings of the 4th Int'l. Conf. On Geocomputation, (Jul. 25-28, 1999), 17 pps.

* cited by examiner

*Primary Examiner*—Samir A. Ahmed
*Assistant Examiner*—Mehdi Rashidian
(74) *Attorney, Agent, or Firm*—Ohlandt, Greeley, Ruggiero & Perle, L.L.P.

(57) ABSTRACT

The present invention relates to a method and an apparatus for processing images of irregularly shaped objects, such as biological specimens, in particular of human or animal origin, or images thereof. The metric quantification of a biological body part or tissue or of an abnormal material spot or aggregate contained therein is also performed by means of the invention method. In particular, the present invention relates to a method for processing images of irregularly shaped objects, comprising a stage of acquisition of a digital image of said object, a stage of image elaboration (IMAEL) for quantifying said digital image to 1 bit and a stage of metrical processing of said 1-bit quantized image, wherein said stage of metrical processing comprises: —) a stage of object's metrical quantification (QUANT) for determining Euclidean perimeter P and/or area A of said object; —) a stage of dimensional calculation (DIM-CLC) for calculating a fractal-corrected perimeter Pf and/or area Af of said object.

32 Claims, 3 Drawing Sheets

METHOD AND APPARATUS FOR ANALYZING BIOLOGICAL TISSUE SPECIMENS

BACKGROUND OF THE INVENTION

1. Field of the Invention

The present invention relates to a method and an apparatus for processing images of irregularly shaped objects, such as biological specimens, in particular of human or animal origin, or images thereof. The metric quantification of a biological body part or tissue or of an abnormal material spot or aggregate contained therein is also performed by means of the invention method.

With the term "abnormal material spot or aggregate" it is intended a material spot or aggregate morphologically connected with a pathological condition or a condition which gives rise to a pre- or post-pathological situation. Examples of abnormal material spot or aggregate may be tumors, atherosclerotic plaques, edemas, hematomes, acute or chronic inflammatory lesions, scars and collagen diseases.

2. Description of Related Art

Observation and analysis of human, animal or plant tissues is normally performed by means of a microscope. Workstations are known in which a microscope is operatively connected with a camera or video for acquisition of an image and with a computer for visual analysis and elaboration of the acquired image.

On the other hand, when the diagnosis of a pathology requires the observation of a body part or organ, such observation can be direct or through indirect means, such as radiography, Computerised Axial Tomography (CAT), ecography analysis and the like. Again, an image, i.e. a digital image of the observed body part or organ can be acquired and analyzed by means of the computer alone or of the computer/camera system.

In any case, several drawbacks are however present in the known apparatuses. The main drawback concerns the way the acquired image is processed by the computer. It is in fact necessary, in some cases, to evaluate physical and geometrical characteristics of the observed body part or of the abnormal material spot or aggregate, in order to assess the evolution of the pathology. A typical example is the evaluation of the extension of atherosclerotic plaques or of tumors. In such a case, the known devices do not allow a correct quantification of the requested parameters (perimeter, area, etc.) to be made, particularly for highly irregularly shaped objects such as the ones named above, with the consequence that the outcome of the analysis may be incorrect or even misleading. There is therefore a need of improved apparatuses that allow a correct quantification of the morphometric parameters of any item for which such quantification is requested.

Another typical problem in the case of observation through microscope is the automatic focusing of the image. In fact, when at high magnification a scanning of the slide is required in order to observe or capture the overall image to be analyzed, a fast and accurate focusing of each scanned part is difficult to be performed.

SUMMARY OF THE INVENTION

The present invention addresses the above and other problems and solve them with a method and an apparatus as depicted in the attached claims.

Further characteristics and the advantages of the method and apparatus for analyzing irregularly shaped objects' images according to the present invention will become clear from the following description of a preferred embodiment thereof, given by way of non-limiting example, with reference to the appended drawings.

The method of the invention allows one to analyze and metrically quantify an object's image, particularly the image of an object having irregular contour, whose Euclidean dimensions are not representative of the actual dimensions of the object. Such a kind of objects recur often when analyzing a biological specimen. However, the method of the invention should not be intended as limited to such a particular field, but can be validly employed in any field of application wherein it is necessary to analyze, whether through microscope observation or by direct image observation, an irregular object's image, such as in the case of a topographical or geophysical survey.

The present invention provides for a method for processing images of irregularly shaped objects, including a stage of acquisition of a digital image of the object, a stage of image elaboration (IMA-EL) for quantizing the digital image to a 1 bit and a stage of metrical processing of the 1-bit quantized image, wherein the stage of the metrical processing includes, a stage of object's metrical quantification (QUANT) for determining Euclidean perimeter P and/or area A of the object; a stage of dimensional calculation (DIM-CLC) for calculating a fractal-corrected perimeter Pf and/or area Af of the object, wherein the fractal-corrected perimeter Pf is calculated from the Euclidean perimeter P and from a fractal dimension $D_p$ of the perimeter; the fractal-corrected area Af is calculated from the Euclidean area A and from a fractal dimension $D_A$ of the area.

With the term "biological specimens" it is herein intended any kind of biological sample taken from the human, animal or plant body (such as a tissue or cell sample) or any image of a human, animal or plant body part (such as a radiography, ecography, CAT and the like).

DETAILED DESCRIPTION OF THE INVENTION

Figure 1:
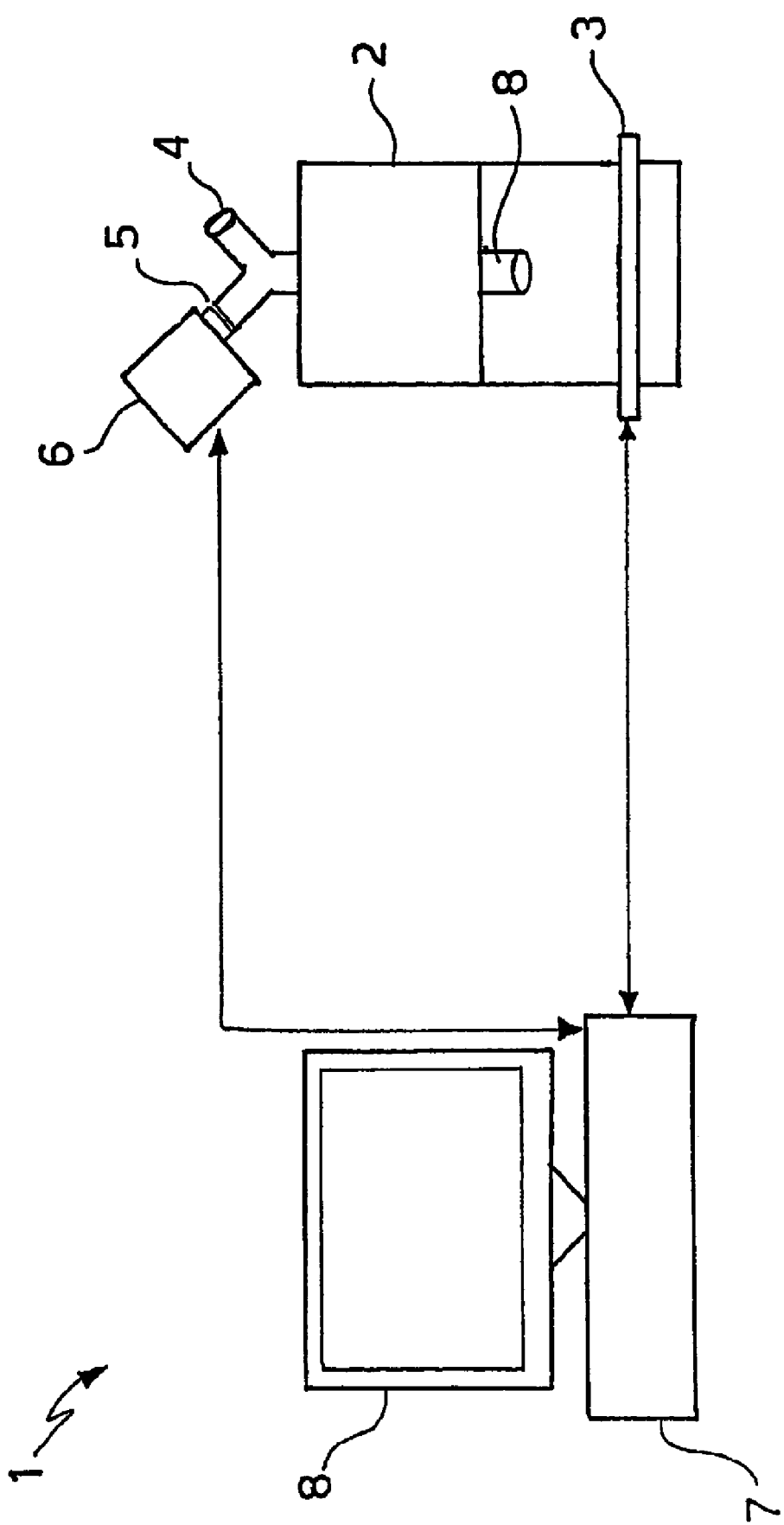
FIG. 1 is a schematic view of the apparatus according to the invention.
Figure 2:
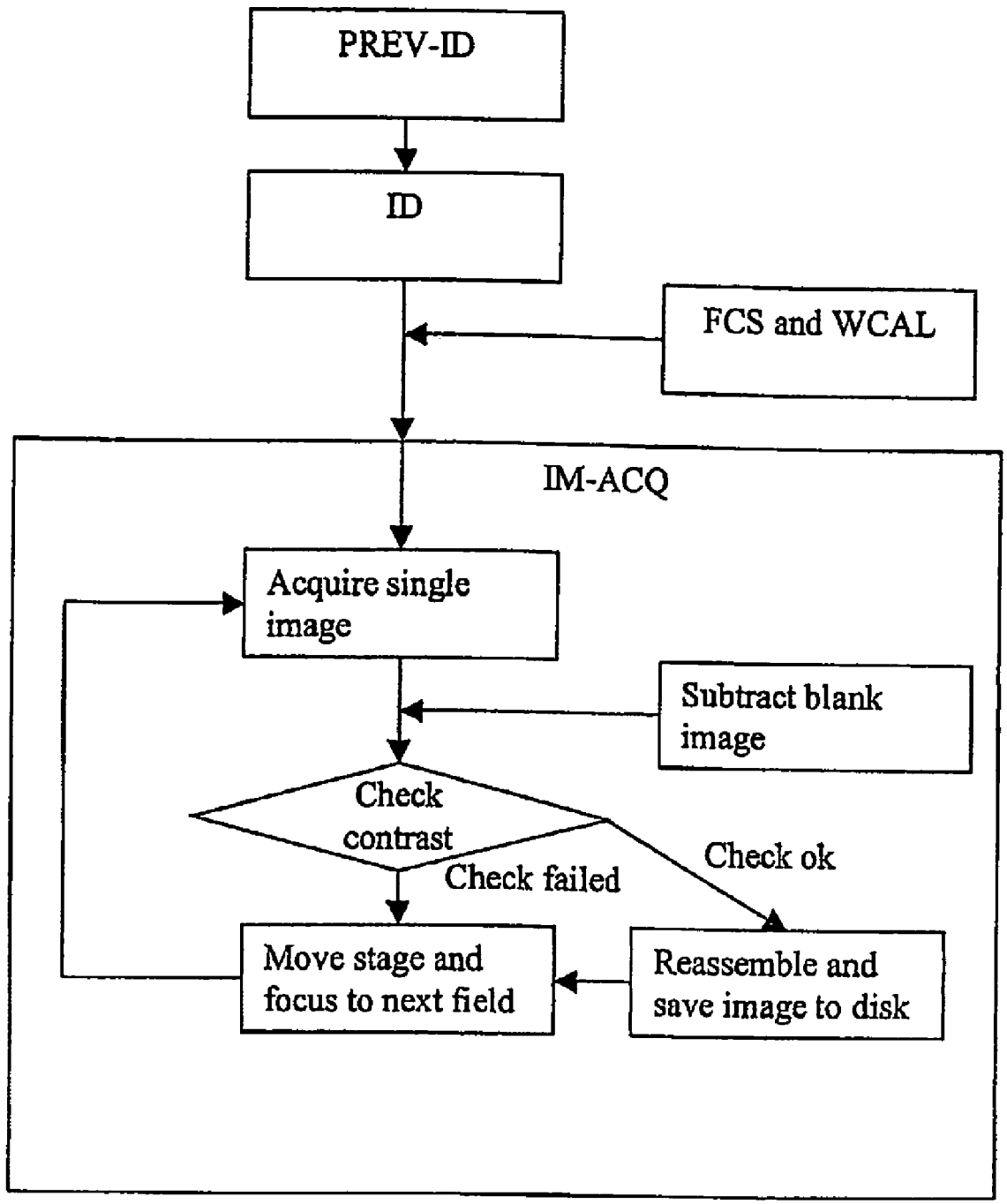
FIG. 2 is a flow chart illustrating the method of acquiring an image according to the invention.
Figure 3:
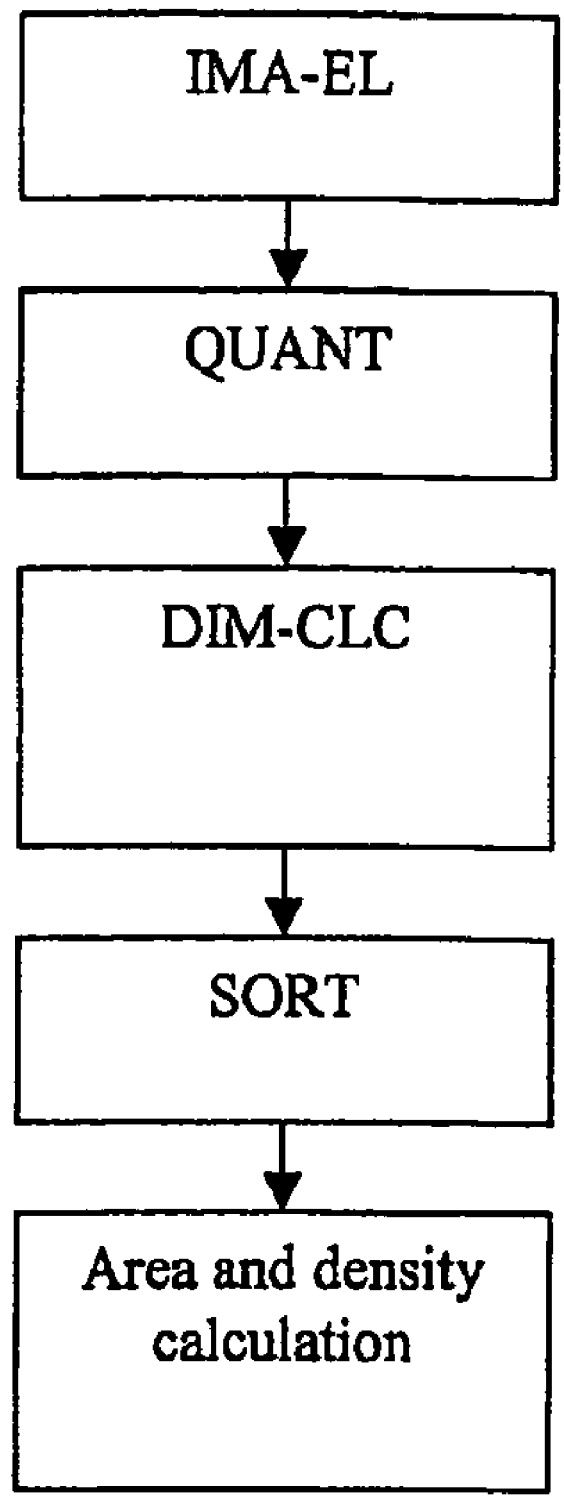
FIG. 3 is a flow chart illustrating the method of processing the acquired image according to the invention.

The example that will be described hereinafter concerns a system 1 for acquiring and processing an image comprising a microscope 2 having a motorized scanning stage 3 capable of moving along the Cartesian axis x, y, z. The microscope 2 is preferably of the type that allow magnification of from 50× up to 1000×.

The microscope 2 is provided with at least one object glass 8, at least one eyepiece 4 and at least one photo-video port 5 for camera attachment. To this latter, electronic image acquisition means 6, in particular a photo/video camera, are operatively connected. Preferably, such electronic image acquisition means 6 are a digital camera, having more preferably a resolution of 1.3 Megapixels.

The electronic image acquisition means 6 are operatively connected with a processing system 7. The processing system 7 may be realized by means of a personal computer (PC) comprising a bus which interconnects a processing means, for example a central processing unit (CPU), to storing means, including, for example, a RAM working memory, a read-only memory (ROM)—which includes a basic program for starting the computer—, a magnetic hard disk, optionally a drive (DRV) for reading optical disks (CD-ROMs), optionally a drive for reading/writing floppy disks. Moreover, the processing system 7 optionally comprises a MODEM or other network means for controlling communication with a telematics network, a keyboard controller, a mouse controller and a video controller. A keyboard, a mouse and a monitor 8 are connected to the respective controllers. The electronic image acquisition means 6 are connected to the bus by means of an interface port (ITF). The scanning stage 3 is also connected to the bus by means of a control interface port (CITF) by which the movement of the stage along the Cartesian axis is governed.

A program (PRG), which is loaded into the working memory during the execution stage, and a respective data base are stored on the hard disk. Typically, the program (PRG) is distributed on one or more CD-ROMs for the installation on the hard disk.

Similar considerations apply if the processing system 7 has a different structure, for example, if it is constituted by a central unit to which various terminals are connected, or by a telematic computer network (such as Internet, Intranet, VPN), if it has other units (such as a printer), etc. Alternatively, the program is supplied on floppy disk, is pre-loaded onto the hard disk, or is stored on any other substrate which can be read by a computer, is sent to a user's computer by means of the telematics network, is broadcast by radio or, more generally, is supplied in any form which can be loaded directly into the working memory of the user's computer.

Coming now to the description of the method for acquiring and processing an image of a biological specimen according to the invention, the specimen slide is placed on the scanning stage 3 of the microscope 2.

It is pointed out that some of the steps of the method of the invention can be performed by the computer system 7 by executing the program PRG.

The first stage of the method of the invention is the stage of identification of the object whose image should be acquired and quantified. (ID stage).

The following method for identifying the object of interest is based on the assumption that such an object is clearly identifiable due to the high contrast of brightness between the object and the background. If such a high contrast is not originally present in the specimen under observation, it can be enhanced for example by staining the specimen with a suitable stain that marks the object or the background.

At the beginning of the ID stage, the magnification is set at the wanted value, in the example 200× magnification. The method starts by:

1a) generating a grid formed by a plurality of boxes to overlap on the image; then, 2a) sending a command by the CPU to the motorized scanning stage 3 to position on the axis x, y in a first position (start position) corresponding to the alignment position of the microscope's object glass with a first box of the grid whose image has to be acquired and a command to the electronic image acquisition means 6 for acquiring the digital image for such a first box, the image being temporarily saved in the RAM memory. Once the image of one box has been acquired, 3a) evaluating by the CPU the brightness of the single pixels in the first box, comparing it with a preset value and determining the brightness contrast inside the box. The method then goes on by 4a) sending a command to the motorized scanning stage 3 to position on the axis x, y in a next position (second position) corresponding to a second box of the grid, sending a command to the electronic image acquisition means 6 for acquiring and temporarily saving on the RAM memory the digital image for such a second box and repeating the operations of step 3) on such image.

The method is continued by 5a) reiterating the routine of step 4) until the whole slide is scanned and the images for each box of the grid are processed. During the execution of the whole routine, the x, y position of the boxes of the grid having a brightness contrast above a predefined value are saved in the hard-disk memory.

Preferably, step 3a) of processing the image of the box of the grid which has been temporarily saved in the RAM memory is performed according to the following method:

i) building a histogram of the brightness intensities of the pixels of the analyzed box, ii) calculating the standard deviation from the mean value of the histogram, and iii) comparing the calculated value of standard deviation with a predefined value.

The position of the boxes having a standard deviation above such a predefined value is saved on the hard disk. Such a predefined value of standard deviation will depend upon the kind of object that should be detected, which on its turn depends on the kind of histological tissue, how it is stained, etc.

The procedure described at points i), ii) and iii) is not the only possible for performing step 3), other known methods being usable, but has the advantage of allowing a reliable result even in the case of a blurred image. It is in fact to be remarked here that, at this stage, focusing of the image has not been usually made yet. Focusing before having identified the object to be observed would result in unacceptable increase of the time spent for the whole procedure.

More preferably, the above ID stage is replaced by or preceded by an identification preview stage (ID-PREV stage) in which the same steps 1) to 5) are performed, but by setting the microscope 2 at a lower magnification (for example, 25× to 100×). This procedure allows a faster execution of the ID stage, since the number of boxes of the grid to iterate will be less. In the case the ID-PREV stage precedes but does not replace the ID stage, this latter will be performed only on the area of the overall image in which the presence of the object has been detected by the ID-PREV.

It should be understood that the object identification stage above described is not strictly necessary for the performance of the method of the invention, even if it allows automatization of the method and a faster execution thereof. In absence of the ID stage and/or ID-PREV stage, identification of the sample can be made manually. On the other hand, absence of a even manual identification stage would cause the further image acquisition stage too long, since the whole slide's image would be captured.

The second stage of the method of the invention is the stage of focus setting (FCS stage). According to this second stage:

1b) a plurality of focus points is selected on the object image to be acquired;

2b) the CPU sends a command to the scanning stage 3 to position the first focus point below the microscope's object glass;

3b) said first focus point is manually brought into focus and its focus parameters are automatically saved in the storing means of the processing system 7

4b) the routine of steps 2b) and 3b) is repeated for each point.

The selected focus points in step 1b) may be equally spaced apart from each other or in any case homogeneously distributed on the object's surface. More preferably, nine focus points are selected and are located at the four corners of the largest parallelepiped inscribed into the object under examination, at the center thereof and at the median point of the parallelepiped's sides.

The third stage of the method is the stage of white calibration (WCAL stage). This stage is performed by 1c) acquiring through the electronic image acquisition means 6 the image of a specimen-free region of the slide (blank image) and saving it in the storing means of the processing system 7.

This blank image will be subtracted by the acquired image of each image region in the subsequent image acquisition stage. This will allow to eliminate any borderline shadow effect in the acquired images.

The fourth stage of the method of the invention is the stage of image acquisition (IM-ACQ stage), which is accomplished according to the following steps:

1d) the CPU sends a command to the scanning stage 3 in order to move it to a first saved box' position of the grid, selected according to previous step 5a), in alignment with the microscope's object glass;

2d) calculating the focus parameters for said first box image by interpolation from the focus parameters calculated according to previous steps 1b) to 4b) for at least two focus points proximal to the said first box;

3d) acquiring the image of said first box through said image acquisition means 6;

4d) subtracting from the acquired image of said first box the blank image acquired according to step 1c) above;

5d) saving the image resulting from step 4d) in the storing means of the processing system 7;

6d) repeating steps from 1d) to 5d) until the whole object to be acquired has been scanned;

7d) reassembling the whole image of the object by aligning the images of the single boxes in relation to their initial position and saving said whole image in the storing means of the processing system 7.

Preferably, said step 7d) of reassembling the whole image of the object is accomplished by:

l) aligning each box' image with the adjacent box' image by overlapping the edges of the image's side in the direction of alignment;

m) in the region of overlap, minimizing the difference of brightness and/or colour intensity between overlapping pixels by shifting the box' images one with respect to each other;

n) repeating steps 1) and m) for each pair of adjacent boxes.

The next stage of the method of the invention is the stage of image elaboration (IMA-EL stage). This stage is performed by quantizing the image to "1 bit" in order to select image's regions on which further calculations are performed. The IMA-EL stage is accomplished according to the following steps:

1e) considering a parameter for each pixel;

2e) comparing said pixel's parameter with a preset threshold value or threshold range for said parameter;

3e) selecting a cluster of active pixels and a cluster of inactive pixels on the base of said comparison.

Said pixel's parameter is preferably brightness intensity (black and white images) or digital colour value. Said preset threshold value or range for said parameter will depend upon the kind of object that should be detected, which on its turn depends on the kind of histological tissue, how it is stained, etc. or on whether the image is a black-and-white image (such as a radiography) or a coloured image of any kind and origin. Selection of such threshold values or ranges can be made in any case by the skilled man, for the particular case, without exercise of any inventive skill. For example, if the object whose image has to be acquired is a collagen material stained with Sirius Red, the active pixels may be those having digital values for red and blue between 0 and 255 and digital values for green between 0 and 130.

Once the digital image has been quantized to 1 bit, the method of the invention provides for a stage of metrical processing of the image which is made on its turn of different stages that will be depicted herein below.

The next stage of the invention method is thus the stage of object's metrical quantification (QUANT stage).

This stage has been set up for improving metrical quantification of the morphometric parameters of irregularly shaped objects, that can not be metered by the usual Euclidean geometry. The microscopic observation of either a normal or abnormal, such as pathological, component of tissue samples taken from any organ, particularly liver, is amazing because of the new irregularities that appear at any magnification (scale of observation). As the extension form of the image of the samples changes, the new irregular details are given measures and dimensions that are independent at each magnification and can not be arranged in a single linear system. Because of this characteristic, which is due to the scabrousness of the external surface of the object to be observed, the visible details, as well as those that can not be visually identified, make all objects with an irregular surface (such as hepatic tissue samples) hardly measurable by means of traditional computer-aided morphometry.

The classical morphometry tackles the problem of measuring natural objects by approximating their irregular outlines and rough surfaces to rectilinear outlines and plane surfaces. In addition, there is the well known non-representative nature of a bioptic sample as its small volume makes the so-called disease staging hardly indicative because of the unevenness of the distribution of lesions in the organ as a whole. It is known that only a slight difference in the site from which a bioptic fragment is taken is often sufficient to obtain a sample that indicates a completely different stage from the one of the adjacent tissue.

Irregular objects were defined "fractal" by Benoit Mandelbrot since, in spite of the fact that their shape changes as a function of magnification, they retain the features of their irregularity at all spatial scales. Although the pieces (not fractions) into which they can be divided are not equal, they preserve the similitude of their irregularity. This property of the parts into which irregular objects can be divided is called "self-similarity". Since the shape of such objects depends on the magnification at which their image is observed, any quantitative metering of the dimensions of the object is a function of the magnification scale. The fractal dimension indicates therefore the "self-similarity" of the fractal pieces of an irregular body and, at each scale, defines the characteristics of the reference means used to measure the physical and geometrical parameters of the observed irregular object.

The first step of the QUANT stage is the calculation of the area of the object under examination. The unit of measurement may be $\mu m^2$ or pixel, taking into account that 1.9 pixel side=1 µm (i.e. 1 pixel side=0.526 µm at a 200× magnification and a videocamera resolution of 1.3 Megapixels). The area A of the object under examination is thus calculated by counting the number of pixels belonging to the cluster of active pixels selected according to the previous IMA-EL stage.

The second step of the QUANT stage is the calculation of the perimeter P of the object under investigation. This step is performed by i) selecting the object contour's pixels, and ii) applying to such selected pixels the perimeter calculation's algorithm according to S. Prashker method (Steve Prashker, An Improved Algorithm for Calculating the Perimeter and Area of Raster Polygons, GeoComputation, 1999, which is herein incorporated by reference). According to the Prashker's method, each active pixel's surroundings are taken into consideration, i.e. the eight pixels around the pixel under examination. To each active pixel is given a "perimeter value", whose sum is the overall perimeter P of the object. If, for example, an internal pixel is considered (i.e. a pixel totally surrounded by active pixels, thus not belonging to the perimeter of the object), to such a pixel is given a "perimeter value" of 0. If a perimeter's pixel is connected with two other pixels through the corners along a diagonal line, the "perimeter value" is $\sqrt{2}$ pixels. If the considered active pixel is connected to one pixel through the corner and to another pixel by a side, the "perimeter value" will be $(0.5+\sqrt{2}/2)$ pixels. If an active pixel is connected to the two adjacent pixels through its sides, the "perimeter value" will be then 1 pixel and so on.

Given the considerable irregularity of the perimeter of the object under examination and in order to be able to meter it in concrete terms, an evaluation of its fractal dimension $D_P$ is made. Similarly, the estimate of the fractal dimension of the area of the selected collagenic structure is indicated by the symbol $D_A$. Both of these fractal dimensions can be automatically determined using the known "box-counting" algorithm.

According to the "box-counting" method, the fractal dimension D is given by the mathematical formula $$D=lim(\epsilon \rightarrow 0)[\log N(\epsilon)/\log(1/\epsilon)]$$

wherein $\epsilon$ is the length of the side of the boxes of the grid in which the object's image has been divided and $N(\epsilon)$ is the number of boxes necessary to completely cover the outline ($D_P$) or the area ($D_A$), respectively, of the measured object. The length $\epsilon$ is expressed in pixel or µm and, in the present calculation method, $\epsilon$ tends to 1 pixel.

The next stage of the invention method is thus the stage of dimensional calculation (DIM-CLC stage).

In order to avoid difficulties in such a calculation, the fractal dimensions D P and D A are approximated as the slope of the straight line obtained by putting in a Cartesian axis system the parameters $\log N(\epsilon)$ versus $\log(1/\epsilon)$.

In practice, the method used to determine $D_P$ comprises the following steps, performed by the CPU of the processing system 7:

a) dividing the image of the object into a plurality of grids of boxes having a side length $\epsilon$, in which $\epsilon$ varies from a first value substantially corresponding to the side of the box in which said object is inscribed and a predefined value which is a fraction of said first value, b) calculating a value of a logarithmic function of $N(\epsilon)$, in which $N(\epsilon)$ is the number of boxes necessary to completely cover the perimeter (P) of the object and of a logarithmic function of $1/\epsilon$ for each $\epsilon$ value of step a), thus obtaining a first set of values for said logarithmic function of $N(\epsilon)$ and a second set of values for said logarithmic function of $1/\epsilon$, c) calculating the fractal dimension $D_P$ as the slope of the straight line interpolating said first set of values versus said second set of values of step b).

The same method is applied for calculating the fractal dimension $D_A$, with the only difference that, in this case, $N(\epsilon)$ is the number of boxes of side $\epsilon$ that completely cover the area of the object to be quantified.

The next step is the d) calculation of the corrected perimeter Pf according to the following algorithm:

$$Pf=P\cdot[1+\lambda_P(D_P-D)] \quad (I)$$

wherein Pf is the fractal-corrected perimeter, P is the Euclidean perimeter, $D_P$ is the fractal dimension, D is the Euclidean dimension (for the perimeter D=1) and $\lambda_P$ is the dilation coefficient. The value of $\lambda_P$ is empirically determined using a histological section acquired at different magnifications (5×, 10×, 20×, 40× objective magnification) and then observing new emerging details of the object under evaluation. The $\lambda_P$ is found to be approximately 4.5.

Analogously, Af, i.e. the corrected area of the irregular object to be observed, is calculated by the CPU of the processing system 7 by means of the following algorithm:

$$Af=A+[\lambda_A(D_A-D)]\cdot(A_p-A) \quad (Ia)$$

wherein A is the Euclidean area, D is the Euclidean dimension (D=2), $\lambda_A$ is the dilation coefficient which was found to be approximately 0.1, Ap the area of the region including the objects to be quantified, automatically obtained with a specific colour threshold and in the same manner as morphological area A; $D_A$ is the fractal dimension of the area which is calculated by means of the box-counting method.

If the object to be quantified is comprised of a plurality of small objects, the calculation of Af can become difficult, in particular for objects having diameter less than 16 microns. In such a case, the calculation of the area of such small objects is made by standard morphometrical evaluation on the active pixels selected according to the IMA-EL stage above described, i.e. by counting the number of active pixels belonging to the same region. To do so, the active pixels belonging to a same region, i.e. to the same small object, must be first of all identified, then each region's area is calculated. Therefore, the method of the invention comprises a stage of object's sorting (SORT stage) which includes the following steps:

1f) scanning of the image quantized to "1 bit" along a predefined direction on a x, y axis system;

2f) selecting a first active pixel along said direction of scanning, said active pixel being identified by a first set of x, y values, said first active pixel belonging to a first object's image;

3f) performing on said first selected active pixel a search routine in the positions next to said selected pixel on the direction's line;

4f) iterating step 3f) until an inactive pixel is found;

5f) assigning to each active pixel selected according to such steps 3f) and 4f) a set of x, y values, saving them in the storing means of the processing system 7 (all of such pixels will have the same y value and x values in progressive order) and switching said pixels from active to inactive in the object's image;

6f) evaluating for each pixel selected according to steps 3f), 4f) and 5f) the two next pixels in the direction ortogonal to the said scanning direction and selecting the active pixels;

7f) performing, for each of said active pixels selected according to step 6f), the routine of steps 3f) to 5f);

8f) iterating steps 6f) and 7f) until all of the connected pixels belonging to the same object have been saved;

9f) repeating steps 1f) and 2f) until a first active pixel of a further object's image is found;

10f) repeating steps 3f) to 9f) until the whole image has been scanned.

Said predefined direction in step 1f) is preferably from left to right starting from top to bottom.

The procedure depicted in steps 1f) to 10f) above allows to identify objects made up from 4-connected pixels, i.e. wherein the pixels have one side in common.

For sorting also 8-connected pixel objects, step 6f) of the above procedure is modified as follows:

6f) evaluating for each pixel selected according to steps 3f), 4f) and 5f) the two next pixels in the direction ortogonal to the said scanning direction and the two pixels adjacent to each of these latter pixels on the parallel line adjacent to the direction's line and selecting the active pixels.

The procedure is then prosecuted according to steps 7f) to 10f).

The procedure herein above depicted is a semi-recursive method which allows, with respect to the standard recursive methods of the art, shorter execution time and less memory request. In fact, taking into consideration an image made up of N×M active pixels, only M recursive calls are necessary, while according to the prior art methods the number of recursive calls would be N×M−1.

After the SORT stage, the method of the invention may perform the following steps:

1g) calculating the area of each object identified according to the SORT stage by counting the number of pixels belonging to said object's image and multiplying it for the area of each pixel (1 pixel side=0.526 μm at 200× magnification and a video-camera resolution of 1.3 Megapixels);

2g) counting the number of objects and calculating its density.

From what has been said above, it is clear that the calculation method of the invention represents an improvement if compared with the known methods. The fractal geometry offers mathematical models derived from the infinitesimal calculus that, when applied to Euclidean geometry, integrate the figures of the morphometrical measurements of natural and irregular objects, thus making them closer to the actual values.

Even if the above described method is construed for the examination of a tissue specimen by means of a microscope, it is clear that it can also be applied, as said before, to images of the human or animal body or parts thereof, such as for example radiography images, Computerized Axial Tomography (CAT), ecography analysis and the like. In such cases use of the microscope will not be necessary, since the image can be directly digitalised by a videocamera and acquired by the computer software. Substantially the same stages of the method can therefore be applied also for such images, the only difference being the fact that the image acquisition means 6 read the image directly without interposition of a microscope.

In such cases, where identification of small objects or of objects having blurred contour (such as radiographies) is required, the ID stage as described above does not allow an efficient identification, so that different methods should be used.

Possible procedures of object's identification make use of an image representation method called Quad Tree. According to such a known method, the image is firstly divided into four quadrants. Each quadrant is on its turn divided into four sub-quadrants and so on up to reaching quadrants of 1 pixel's side. The image information is reported onto a tree of degree 4, wherein the parent node contains information which is in common with all of the son nodes (from each parent node originates four son nodes) which refer to the four quadrants into which the parent quadrant is divided.

A first alternative identification procedure suitable for the method of the invention is an image subtraction technics which comprises the following steps:

1h) generating a blurred image of the object to be examined;

2h) subtracting from the image of the object said blurred image in order to obtain an image in which the bright colour regions correspond to the image regions having higher contrast and the dark coloured regions correspond to the image regions having lower contrast;

3h) saving in the storing means of the processing system 7 the image of the regions whose colour or brightness values are above a predefined threshold value.

Preferably, said step 1 h) of generating a blurred image is performed by:

dividing the image into quadrants iteratively according to the Quad Tree method up to quadrant having predefined side length (preferably, 1 pixel's side quadrants);

calculating for each quadrant at each division scale the mean value of the pixels, in order to associate to each quadrant a set of values;

generating a colour map (RGB images) or an intensity map (grey scale images) wherein each point value is the mean of the set of values of each quadrant, said colour or intensity map being the blurred image of the original image.

The procedure described herein above is particularly suitable in the case of small objects' detection or to distinguish objects in the foreground from the background.

Furthermore, by modulating the blurring degree, it is possible to discriminate between objects of different dimension, for example by selecting only objects below a predetermined magnitude. In fact, if the Quad Tree procedure is stopped once a minimum quadrant magnitude of for example 10 pixel is reached (instead of a minimum 1 pixel magnitude), the blurring degree is higher, which means that a more blurred image is obtained. If such a more blurred image is subtracted from the object's image according to step 2h) above, all of the objects having a magnitude above 10 pixels are excluded and the resulting image shows just the smaller objects.

A second alternative identification procedure suitable for the ID stage of the method of the invention comprises generating a homogeneity map according to the following steps:

1l) dividing the image into quadrants iteratively according to the Quad Tree method up to quadrant having predefined side length (preferably, 1 pixel's side quadrants);

2l) calculating for each quadrant at each division scale the relative dispersion (RD) obtained as the Standard Deviation divided by the mean value of the pixels, in order to associate to each quadrant a set of values of RD;

3l) generating a homogeneity map as a grey scale image, each point's brightness being given by the mean of the set of values of RD for each quadrant, wherein the image's regions having high brightness correspond to homogeneous regions;

4l) selecting the pixels of the homogeneity map having a brightness intensity above a predefined threshold value and saving their position in the storing means of the processing system 7.

Naturally, only some specific embodiments of the method and apparatus for analyzing biological tissue specimens according to the present invention have been described and a person skilled in the art will be able to apply any modification necessary to adapt it to particular applications without, however, departing from the scope of protection of the present invention.

The invention claimed is:

1. Method for processing images of irregularly shaped objects, comprising using at least a processor to perform the steps of: a stage of acquisition of a digital image of said object, a stage of image elaboration (IMA-EL) for quantizing said digital image to a 1 bit quantized image and a stage of metrical processing of said 1-bit quantized image, wherein said stage of metrical processing comprises a stage of object's metrical quantification (QUANT) for determining an Euclidean perimeter P and an Euclidean area A of said object;

a stage of dimensional calculation (DIM-CLC) for calculating a fractal-corrected perimeter Pf and a fractal-corrected area Af of said object, wherein said fractal-corrected perimeter Pf is calculated from said Euclidean perimeter P and from a fractal dimension $D_P$ of the perimeter, and wherein said fractal-corrected area Af is calculated from said Euclidean area A and from a fractal dimension $D_A$ of the area.

2. Method for processing images of irregularly shaped objects, comprising using at least a processor to perform the steps of: a stage of acquisition of a digital image of said object, a stage of image elaboration (IMA-EL) for quantizing said digital image to a 1 bit quantized image and a stage of metrical processing of said 1-bit quantized image, wherein said stage of metrical processing comprises a stage of object's metrical quantification (QUANT) for determining an Euclidean perimeter P and/or an Euclidean area A of said object;

a stage of dimensional calculation (DIM-CLC) for calculating a fractal-corrected perimeter Pf and/or a fractal-corrected area Af of said object, wherein said fractal-corrected perimeter Pf is calculated from said Euclidean perimeter P and from a fractal dimension $D_P$ of the perimeter, and wherein said fractal-corrected area Af is calculated from said Euclidean area A and from a fractal dimension $D_A$ of the area, wherein said fractal-corrected perimeter Pf is calculated substantially according to the following formula (I):

$$Pf = P \cdot [1 + \lambda_P(D_P - 1)]$$

wherein P is the Euclidean perimeter, $D_P$ is the fractal dimension of the perimeter and the dilation coefficient $\lambda_P$ is approximately 4.5.

3. Method for processing images of irregularly shaped objects, comprising using at least a processor to perform the steps of: a stage of acquisition of a digital image of said object, a stage of image elaboration (IMA-EL) for quantizing said digital image to a 1 bit quantized image and a stage of metrical processing of said 1-bit quantized image, wherein said stage of metrical processing comprises a stage of object's metrical quantification (QUANT) for determining an Euclidean perimeter P and/or an Euclidean area A of said object;

a stage of dimensional calculation (DIM-CLC) for calculating a fractal-corrected perimeter Pf and/or a fractal-corrected area Af of said object, wherein said fractal-corrected perimeter Pf is calculated from said Euclidean perimeter P and from a fractal dimension $D_P$ of the perimeter, and wherein said fractal-corrected area Af is calculated from said Euclidean area A and from a fractal dimension $D_A$ of the area, wherein said fractal-corrected area Af is calculated substantially according to the following formula (Ia):

$$Af = A + [\lambda_A(D_A - 2)] \cdot (A_p - A)$$

wherein A is the Euclidean area, the dilation coefficient $\lambda_A$ is approximately 0.1, Ap is the area of the region including the objects to be quantified and $D_A$ is the fractal dimension of the area.

4. A method according to claims 1, 2, or 3, wherein said fractal dimension $D_P$ of the perimeter and said fractal dimension $D_A$ of the area are determined according to the following steps:

a) dividing the image of the object into a plurality of grids of boxes having a side length $\epsilon$, in which $\epsilon$ varies from a first value substantially corresponding to the side of the box in which said object is inscribed and a predefined value which is a fraction of said first value, b) calculating a value of a logarithmic function of $N(\epsilon)$, in which $N(\epsilon)$ is the number of boxes necessary to completely cover the perimeter (P) or the area (A), respectively, of the object and of a logarithmic function of $1/\epsilon$ for each $\epsilon$ value of step a), thus obtaining a first set of values for said logarithmic function of $N(\epsilon)$ and a second set of values for said logarithmic function of $1/\epsilon$, c) calculating the fractal dimensions $D_P$ or $D_A$ as the slope of the straight line interpolating said first set of values for said logarithmic function of $N(\epsilon)$ for the perimeter (P) or the area (A), respectively, versus said second set of values of step b).

5. A method according to claims 1, 2 or 3, wherein said stage of image elaboration (IMA-EL) is performed according to the following steps:

1e) considering a parameter for each pixel;

2e) comparing said pixel's parameter with a preset threshold value or threshold range for said parameter;

3e) selecting a cluster of active pixels and a cluster of inactive pixels on the base of said comparison.

6. A method according to claim 1, wherein said pixel's parameter is brightness intensity (black and white images) or digital colour value.

7. A method according to claim 1, wherein in said stage of object's metrical quantification (QUANT) the area A of the object is calculated by counting the number of pixels belonging to the cluster of active pixels selected according to the previous IMA-EL stage and correlating said number of counted active pixels with the area A of the object.

8. A method according to claim 1, wherein in said stage of object's metrical quantification (QUANT) the perimeter P of the object is calculated by i) selecting the object contour's pixels, and ii) applying to such selected pixels a perimeter calculation's algorithm.

9. A method according to claim 8, wherein said perimeter calculation's algorithm is according to S. Prashker method, wherein to each active pixel belonging to the object is given a "perimeter value", which is a function of the position of the active pixels adjacent to the pixel under examination, the sum of said "perimeter values" being the overall perimeter P of the object.

10. A method according to claim 1, further comprising a stage of object's sorting (SORT) for identifying objects made up from 4-connected pixels, which includes the following steps:

1f) scanning of the image quantized to "1 bit" along a predefined direction on a x, y axis system;

2f) selecting a first active pixel along said direction of scanning, said active pixel being identified by a first set of x, y values, said first active pixel belonging to a first object's image;

3f) performing on said first selected active pixel a search routine in the positions next to said selected pixel on the direction's line;

4f) iterating step 3f) until an inactive pixel is found;

5) assigning to each active pixel selected according to such steps 3f) and 4f) a set of x, y values, saving them in the storing means of the processing system 7 and switching said pixels from active to inactive in the object's image;

6f) evaluating for each pixel selected according to steps 3f), 4f) and 5f) the two next pixels in the direction ortogonal to the said scanning direction and selecting the active pixels;

7f) performing, for each of said active pixels selected according to step 6f), the routine of steps 3f) to 5f);

8f) iterating steps 6f) and 7f) until all of the connected pixels belonging to the same object have been saved;

9f) repeating steps 1f) and 2f) until a first active pixel of a further object's image is found;

10f) repeating steps 3f) to 9f) until the whole image has been scanned.

11. A method according to claim 10, wherein said predefined direction in step 1f) is preferably from left to right starting from top to bottom.

12. A method according to claim 10, wherein the stage of object's sorting according to steps 1f) to 10f) is performed for also identifying objects made up from 8-connected pixels, in said stage the step 6f) being modified as follows:

6f) evaluating for each pixel selected according to steps 3f), 4f) and 5f) the two next pixels in the direction ortogonal to the said scanning direction and the two pixels adjacent to each of these latter pixels on the parallel line adjacent to the direction's line and selecting the active pixels.

13. A method according to claim 12, further comprising the following steps: 1g) calculating the area of each object identified according to the SORT stage by counting the number of pixels belonging to said object's image and correlating it with the area of said each object; 2g) optionally, counting the number of objects and calculating its density.

14. A method according to claim 1, wherein said stage of acquisition of the digital image of the object comprises the following:

stage of providing a system for acquiring and processing an image including a microscope having a motorized scanning stage capable of moving along the Cartesian axis x, y, z, electronic image acquisition means operatively connected to said microscope, said motorized scanning stage and said electronic image acquisition means being operatively connected to a processing system, said processing system comprising a processing unit (CPU), storing means which include a RAM working memory and a hard disk;

stage of identification of the object (ID) for saving the Cartesian parameters of the object's image, and stage of image acquisition (IM-ACQ) of said identified object.

15. A method according to claim 14, wherein said stage of identification of the object (ID) comprises the following steps:

1a) generating, at a preset magnification of the said microscope, a grid formed by a plurality of boxes to overlap on the image;

2a) sending a command to the motorized scanning stage to position on the axis x, y in a first position (start position) corresponding to the alignment position of the microscope's object glass with a first box of the grid whose image has to be acquired and a command to the electronic image acquisition means for acquiring the digital image for such a first box, the image being temporarily saved in the working memory (RAM);

3a) evaluating the brightness of the single pixels in the first box, comparing it with a preset value and determining the brightness contrast inside the box;

4a) sending a command to the motorized scanning stage to position on the axis x, y in a next position (second position) corresponding to a second box of the grid, sending a command to the electronic image acquisition means for acquiring and temporarily saving on the working memory (RAM) the digital image for such a second box and repeating the operations of step 3a) on such image;

5a) reiterating the routine of step 4a) until the whole slide is scanned and the images for each box of the grid are processed, wherein during the execution of the whole routine, the x, y position of the boxes of the grid having a brightness contrast above a predefined value are saved in the hard-disk memory, wherein said preset magnification of the said microscope is preferably 200× magnification.

16. A method according to claim 15, wherein said step 3a) of processing the image of the box of the grid which has been temporarily saved in the working memory (RAM) is performed according to the following method: i) building a histogram of the brightness intensities of the pixels of the analyzed box, ii) calculating the standard deviation from the mean value of the histogram, and iii) comparing the calculated value of standard deviation with a predefined value, wherein the position of the boxes having a standard deviation above such a predefined value is saved on the hard disk.

17. A method according to claim 15, wherein said ID stage is replaced by or preceded by an identification preview stage (ID-PREV), which comprises steps from 1a) to 5a) and wherein said preset magnification of the microscope is selected between 25× and 100×.

18. A method according to claim 17, further comprising a stage of focus setting (FCS) which includes the following steps:

1b) selecting a plurality of focus points on the object image to be acquired;

2b) sending a command to the scanning stage to position the first focus point below the microscope's object glass;

3b) manually bringing into focus said first focus point and automatically saving its focus parameters in the storing means of the processing system;

4b) repeating the routine of steps 2b) and 3b) for each point.

19. A method according to claim 18, wherein said plurality of focus points are equally spaced apart from each other or homogenously distributed on the object's surface.

20. A method according to claim 19, wherein said plurality of focus points is nine focus points that are selected and are located at the four corners of the largest parallelepiped inscribed into the object under examination, at the center thereof and at the median point of the parallelepiped's sides.

21. A method according to claim 20, further comprising a stage of white calibration (WCAL), which comprises 1c) acquiring through the electronic image acquisition means the image of a specimen-free region (blank image) and saving it in the storing means of the processing system.

22. A method according to claim 21, wherein said stage of image acquisition (IM-ACQ) comprises the following steps:

1d) sending a command to the scanning stage in order to move it to a first saved box position of the grid, selected according to previous step 5a), in alignment with the microscope's object glass;

2d) calculating the focus parameters for said first box image by interpolation from the focus parameters calculated according to previous steps 1b) to 4b) for at least two focus points proximal to the said first box;

3d) acquiring the image of said first box through said image acquisition;

4d) subtracting from the acquired image of said first box the blank image acquired according to step 1c) above;

5d) saving the image resulting from step 4d) in the storing means of the processing system;

6d) repeating steps from 1d) to 5d) until the whole object to be acquired has been scanned;

7d) reassembling the whole image of the object by aligning the images of the single boxes in relation to their initial position and saving said whole image in the storing means of the processing system.

23. A method according to claim 22, wherein said step 7d) of reassembling the whole image of the object comprises:
l) aligning each box' image with the adjacent box' image by overlapping the edges of the image's side in the direction of alignment;
m) in the region of overlap, minimizing the difference of brightness and/or colour intensity between overlapping pixels by shifting the box' images one with respect to each other;
n) repeating steps l) and m) for each pair of adjacent boxes.

24. A method according to claim 23, wherein said ID stage is performed by:
1h) generating a blurred image of the object to be examined;
2h) subtracting from the image of the object said blurred image in order to obtain an image in which the bright colour regions correspond to the image regions having higher contrast and the dark coloured regions correspond to the image regions having lower contrast;
3h) saving in the storing means of the processing system the image of the regions whose colour or brightness values are above a predefined threshold value.

25. A method according to claim 24, wherein said step 1h) of generating a blurred image comprises:
dividing the image into quadrants iteratively according to the Quad Tree method up to quadrant having predefined side length;
calculating for each quadrant at each division scale the mean value of the pixels, in order to associate to each quadrant a set of values;
generating a colour map (RGB images) or an intensity map (grey scale images) wherein each point value is the mean of the set of values of each quadrant, said colour or intensity map being the blurred image of the original image.

26. A method according to claim 23, wherein said ID stage is performed by:
1l) dividing the image into quadrants iteratively according to the Quad Tree method up to quadrant having predefined side length;
2l) calculating for each quadrant at each division scale the relative dispersion (RD) obtained as the Standard Deviation divided by the mean value of the pixels, in order to associate to each quadrant a set of values of RD;
3l) generating a homogeneity map as a grey scale image, each point's brightness being given by the mean of the set of values of RD for each quadrant, wherein the image's regions having high brightness correspond to homogeneous regions;
4l) selecting the pixels of the homogeneity map having a brightness intensity above a predefined threshold value and saving their position in the storing means of the processing system.

27. A method according to claim 26, wherein said system includes a motorized scanning stage capable of moving along the Cartesian axis x, y, z, electronic image acquisition means operatively aligned with said motorized scanning stage, said motorized scanning stage and said electronic image acquisition means) being operatively connected to a processing system, said processing system comprising a processing unit (CPU), storing means which include a RAM working memory and a hard disk.

28. A method for acquiring the digital image of an object, said method comprising the stages as depicted in claim 27.

29. A system for acquiring and processing an image including a microscope having a motorized scanning stage capable of moving along the Cartesian axis x, y, z, electronic image acquisition means operatively connected to said microscope, said motorized scanning stage and said electronic image acquisition means being operatively connected to a processing system, said processing system comprising a processing unit (CPU), storing means which include a RAM working memory and a hard disk, said processing system running a program (PRG) to perform a method according to claim 1.

30. A system for acquiring and processing an image including a motorized scanning stage capable of moving along the Cartesian axis x, y, z, electronic image acquisition means operatively aligned with said motorized scanning stage, said motorized scanning stage and said electronic image acquisition means being operatively connected to a processing system, said processing system comprising a processing unit (CPU), storing means which include a RAM working memory and a hard disk, said processing system running a program (PRG) to perform a method according to claim 1.

31. A computer program product stored on a computer storage medium having a computer readable program code embodied therein, said computer readable program code adapted to be executed to implement a method for generating a report, said method comprising:
a stage of acquisition of a digital image of said object, a stage of image elaboration (IMA-EL) for quantizing said digital image to a 1 bit quantized image and a stage of metrical processing of said 1-bit quantized image, wherein said stage of metrical processing comprises
a stage of object's metrical quantification (QUANT) for determining an Euclidean perimeter P and an Euclidean area A of said object;
a stage of dimensional calculation (DIM-CLC) for calculating a fractal-corrected perimeter Pf and a fractal-corrected area Af of said object,
wherein said fractal-corrected perimeter Pf is calculated from said Euclidean perimeter P and from a fractal dimension $D_P$ of the perimeter, and wherein said fractal-corrected area Af is calculated from said Euclidean area A and from a fractal dimension $D_A$ of the area.

32. Method for processing images of irregularly shaped objects, comprising using at least a processor to perform the steps of: a stage of acquisition of a digital image of said object, a stage of image elaboration (IMA-EL) for quantizing said digital image to a 1 bit quantized image and a stage of metrical processing of said 1-bit quantized image, wherein said stage of metrical processing comprises
a stage of object's metrical quantification (QUANT) for determining an Euclidean perimeter P and/or an Euclidean area A of said object;
a stage of dimensional calculation (DIM-CLC) for calculating a fractal-corrected perimeter Pf and/or a fractal-corrected area Af of said object,
wherein said fractal-corrected perimeter Pf is calculated from said Euclidean perimeter P and from a fractal dimension $D_P$ of the perimeter, and wherein said fractal-corrected area Af is calculated from said Euclidean area A and from a fractal dimension $D_A$ of the area,
wherein said fractal-corrected perimeter Pf is calculated substantially according to the following formula (I):

$$Pf = P[1 + \lambda_P(D_P - 1)]$$

wherein said fractal-corrected area Af is calculated substantially according to the following formula (Ia):

$$Af = A + [\lambda_A(D_A - 2)] \cdot (Ap - A).$$

* * * * *